United States Patent [19]
Hatch

[11] Patent Number: 5,276,953
[45] Date of Patent: Jan. 11, 1994

[54] AUTOMATIC, PROGRAMABLE DRILLING, GLUING AND DOWELING APPARATUS

[76] Inventor: J. Mel Hatch, 4850 S. Hidden Cove Cir., Murray, Utah 84123

[21] Appl. No.: 932,609

[22] Filed: Aug. 19, 1992

[51] Int. Cl.$^5$ .................. B23Q 5/54; B23B 39/04; B27C 9/00
[52] U.S. Cl. .................. 29/564.1; 29/34 B; 144/353; 156/513
[58] Field of Search .......... 29/50, 34B; 525.1, 564.1; 144/353; 227/51, 27, 52, 14, 40, 69; 156/513

[56] References Cited

U.S. PATENT DOCUMENTS

| | | | |
|---|---|---|---|
| 3,891,134 | 6/1975 | Kratsch et al. | 227/27 X |
| 3,992,767 | 11/1976 | Lewis | 156/513 X |
| 4,578,846 | 4/1986 | Schott et al. | 29/34 B |
| 4,834,153 | 5/1989 | Stegherr | 29/525.1 X |
| 4,955,119 | 9/1990 | Bonomi et al. | 29/50 |
| 4,967,947 | 11/1990 | Sarh | 227/52 |
| 5,010,841 | 4/1991 | Stewart | 29/34 B X |

FOREIGN PATENT DOCUMENTS 1103930 7/1984 U.S.S.R. .................. 29/34 B

Primary Examiner—William Briggs
Attorney, Agent, or Firm—Terry M. Crellin

[57] ABSTRACT

An automatic apparatus for drilling dowel holes in a workpiece and then inserting dowels in the dowel holes is disclosed. The apparatus has a moveable carriage that moves along the side edge of the workpiece. A drilling tool and a dowel inserting tool are attached to the moveable carriage. A programable controller controls the movement of the carriage and the operation of the drilling tool and the dowel injecting tool. The controller is programmed to move the carriage to a plurality of positions for drilling dowel holes in the workpiece. The number of dowel holes, the spacing of the dowel holes and the depth of the dowel holes are entered into a control panel to program the controller. The controller is then activated to move the carriage and operate the dowel drilling tool and dowel inserting tool. As the carriage moves in sequential steps along the workpiece, the dowel drilling tool drills a dowel hole at each of the steps in the movement of the carriage, and the dowel inserting tool inserts dowels in the drilled dowel holes.

4 Claims, 2 Drawing Sheets

AUTOMATIC, PROGRAMABLE DRILLING, GLUING AND DOWELING APPARATUS

BACKGROUND OF THE INVENTION

1. Field of the Invention

The present invention relates to apparatus for drilling dowel holes or bores in a workpiece, injecting glue into the drilled dowel bores and then setting dowels into the bores. In particular, the present invention relates to improvements in such apparatus wherein a programable controller is provided for automatically controlling the movement of a combination drill head and dowel setting head along the length of the side edge of the workpiece. The programable controller is programmed to control operation of the combination drill head and dowel setting head, as the same is being moved along the length of the side edge of the workpiece, to (a) drill dowel bores at selected, spaced positions along the length of the side edge of the workpiece, (b) inject glue into the bores, and (c) set dowels in the glued bores.

2. State of the Art

Various types of apparatus have been proposed and used in the prior art for drilling bores or holes in a workpiece, injecting glue into the bores and then inserting or setting dowels into the glued bores. In the more simple apparatus as exemplified in U.S. Pat. Nos. 3,738,766 and 4,235,565, jigs are used for holding a power tool such as a portable drill. The workpiece is moved into position relative to the jig, and the portable drill is used to drill a bore into the workpiece. Additional bores can be formed by manually moving the workpiece to a new position. Once all the desired bores are formed, the workpiece is removed from the jig. Glue is then manually injected into the bores, and dowels are manually inserted into the glued bores.

In U.S. Pat. No. 4,693,647 a dowel hole drilling machine is disclosed having a work table and a jig containing a tool that drives a rotating drilling element. The workpiece is carried by the worktable, and the worktable moves toward the rotating drilling element when the workpiece has been located in proper position on the worktable. As the workpiece engages the rotating drilling element, a bore is drilled in the workpiece. After the workpiece has been removed from the table, glue can be injected into the bore and a dowel then set in the glued bore.

In U.S. Pat. Nos. 3,601,301 and 4,834,153 apparatus is disclosed in which the workpiece is held in place and multiple bores are formed in the workpiece simultaneously by multiple drilling elements which are moved as a unit towards the workpiece such that the drilling elements simultaneously engage the workpiece and drill bores therein. The drilling elements are then withdrawn and without moving the workpiece, multiple heads for injecting glue and inserting dowels are moved into alignment with the bores that were previously formed in the workpiece. These heads simultaneously inject glue into the respective bores and immediately thereafter insert dowels into the glued bores.

Apparatus for simultaneously forming a plurality of dowel bores in the side edge of a workpiece is known in the art. Such apparatus as shown in U.S. Pat. No. 4,639,171 comprises a work support upon which a workpiece can be securely held in proper position. A bank of drill chucks is provided, with the drill chucks being aligned and equally spaced relative to each other. The drill chucks are further driven by a common motor or drive unit. Drills are releasably attached to desired drill chucks to correspond with the number of bores that are to be formed in the side edge of the workpiece. The drills are attached to appropriate drill chucks so that proper spacing of the drills is achieved. The bank of drill chucks containing the selected drills moves as a unit toward the workpiece such that the drills simultaneously engage the edge of the workpiece and simultaneously drill bores in the edge of the workpiece. To vary the number of bores being formed in subsequent workpieces or the spacing of the bores, the drills must be removed and relocated to the appropriate drill chucks.

Although not shown in U.S. Pat. No. 4,639,171, apparatus in accordance with the previous paragraph is known in the art wherein a separate bank of dowel inserting devices are provided in addition to the bank of drill chucks. When the bank of drill chucks is withdrawn from the side edge of the workpiece in which the dowel holes have been formed, the bank of dowel inserting devices having individual dowel inserting members spaced at the same spacing as the dowel bores is brought into close proximity to the side edge of the workpiece, with the individual dowel inserting members being in alignment with the respective dowel bores in the side edge of the workpiece. The dowel inserting members have means for first injecting glue simultaneously into the dowel bores and then dowels are simultaneously inserted or set in the glued bores.

3. Objective

A principal objective of the invention is to provide a novel improvement in the dowel drilling and setting apparatus of the type used in forming a plurality of dowel bores in the side edge of a workpiece and which were referred to in the two immediately preceding paragraphs.

BRIEF DESCRIPTION OF THE INVENTION

The improvement of the present invention comprises a mobile carriage that carries one and possibly two drilling tools and a like number of glue injecting members and dowel inserting members. The carriage moves longitudinally along a path adjacent to and parallel with the side edge of the workpiece. The movement of the carriage is controlled by a programable controller such as a computer. The controller is programmed to move the carriage in sequence to a plurality of positions along the length of the side edge of the workpiece. The exact positions in which the dowel bores are to be formed are programmed into the controller. The controller moves the carriage to the first programmed position. The drilling tool is then activated by the controller to drill a bore having a preset depth in the side edge of the workpiece. The drilling tool is withdrawn and the carriage moved so as to bring the glue injecting member and the dowel inserting member into alignment with the bore that was just formed. Glue is injected into the bore and a dowel is inserted in the glued bore. The controller then moves the carriage to the next programmed position for drilling a bore. The bore is drilled, glue is injected into the bore and a dowel is inserted into the glued bore. The controller then moves to the next subsequent position in which a bore is to be drilled, and the process is repeated until all the bores have been formed along the length of the side edge and dowels have been inserted in the bores. A new workpiece can then be positioned on the apparatus, and a new program for dowel holes can be introduced into the controller in case more or less bores are to be formed as compared to the previous workpiece or if the bores are to be spaced at different spacing as compared to the previous workpiece. If the new workpiece is to be identical to the previous workpiece, the controller can be made to repeat the program used on the previous workpiece.

Additional objects and features of the invention will become apparent from the following detailed description, taken together with the accompanying drawing.

THE DRAWINGS

A preferred embodiment of a improved apparatus in accordance with the present invention representing the best mode presently contemplated of carrying out the invention is illustrated in the accompanying drawings in:

FIG. 1 is a pictorial of apparatus showing some of the components of the apparatus in exploded position so as to show all the basic elements of the apparatus; and FIG. 2 is a cross section of the glue injecting member and dowel inserting member of the apparatus of FIG. 1 showing a removable cover for the nozzle of the glue injecting member.

DETAILED DESCRIPTION OF THE ILLUSTRATED EMBODIMENT

Figure 1:
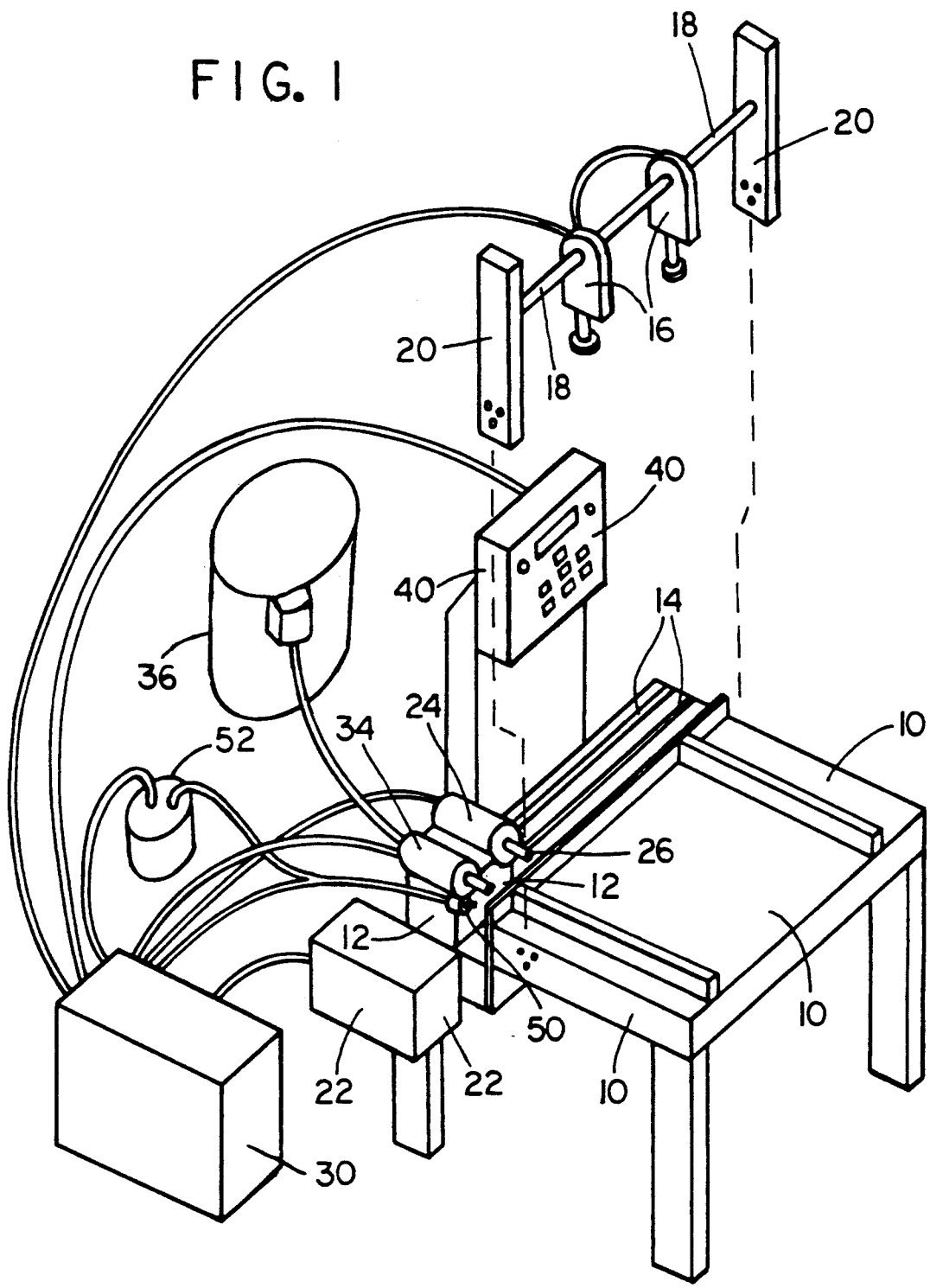

Referring to the drawing, an improved automatic drilling and doweling apparatus is shown. As is well known in the art, the apparatus has means for securing a workpiece in a work position. Such means comprises a table 10 on which the workpiece can be positioned flatwise against the upper surface of the table 10. Means will be described hereinafter for clamping the workpiece to the upper surface of the table 10. The apparatus, as will be apparent from the following description, comprises improvements in means for drilling dowel holes in the side edge of the workpiece and inserting dowels into respective dowel holes.

The improvement of the present invention comprises a moveable carriage 12 that can move longitudinally along a path adjacent to and parallel with the side edge of the workpiece in which the dowel holes are to be drilled (the workpiece itself is not shown in the drawings). As illustrated, the carriage 12 moves along track means 14 that are positioned along the side of the table 10.

The table 10 has clamping members 16 that are located above the table 10 and near the side of the table 10 that is adjacent to the track means 14. The clamp members 16 can be pneumatic or electomechanical in operation, so that they can be activated by the controller 30 to advance the clamping feet of the clamp members 16 toward the upper surface of the table 10 and thus securely hold a workpiece on the table 10, with the side edge of the workpiece that is to have dowel holes bored therein being positioned adjacent to the side of the table 10 that is in turn adjacent to the track means 14. As shown in FIG. 1, the clamp members 16 are supported on a rod 18 the is suspended above the surface of the table 10 by extensions 20 that project upwardly from the opposite end of the table 10. As is well known in the art, the clamp members 16 can be moveable along the rod 18 so that they can be set in desired positions between the ends of the table 10 to firmly constrain a workpiece against the upper surface of the table 10.

A drive means 22 is provided for moving the carriage 12 along the track means 14. As illustrated, the drive means 22 is located adjacent one end of the table 10 and one end of the track means 14. The drive means 22 preferably comprises a stepping motor that is controlled by the controller 30 so as to be capable of moving the carriage 12 in precise movement along the track means 14. Advantageously, the carriage 12 is driven along the track means 14 by a drive belt that is in turn driven by the stepping motor of the drive means 22. Instead of a drive belt, a rack and pinion system or a drive auger, both being well known in the art, could be used to drive the carriage 12 along the track means 14 by the drive means 22.

A drilling tool 24 is attached to the carriage 12. The drilling tool 24 has a drill bit 26 which can be advanced in a direction of the workpiece and retracted in a direction away from the workpiece. The drill bit 26 can be advanced by advancing the drilling tool 24 or by providing a drilling tool 24 that has the capability of extending the drill bit 26 from the drilling tool 24 and retracting the drill bit 26 back toward the drilling tool 24. As illustrated, the drilling tool 24 is of the type that the drill bit 26 can be extended and retracted longitudinally from the drilling tool 24 along the rotary axis of the drill bit 26.

A dowel inserting tool 34 is also attached to the carriage 12 and positioned adjacent to the drilling tool 24. The dowel inserting tool 34 is capable of setting a dowel in a respective dowel hole when the dowel inserting tool 24 is aligned with the dowel hole. The dowel inserting tool 34 is of conventional design and is well known in the art as can be seen from the U.S. Patents mentioned earlier in the Prior Art section of this disclosure. Thus, a further description of the dowel inserting tool 34 is deemed redundant and unnecessary. For descriptive purposes, there is shown in FIG. 1, a feeder bowl 36 that stores dowels and uses vibratory motion to feed the dowels one at a time through a feed line to the dowel inserting tool 34. Such vibratory feeder bowls 36 and feed lines to the dowel inserting tool 34 are also well known in the art and need no further description here.

A programable controller 30 is provided as mentioned previously for controlling the movement of the carriage 12 such that the carriage 12 can be moved in sequence to a plurality of positions along the track means 14 in accordance with the programming of the programable controller 30. The controller 30 is preferably a computer that is programable from an input entry panel 40. The computer 30 is itself operated by an internal operation program to accept input from the input entry panel 40 as to the number of stops or positions that the carriage 12 is to move in its travel along the track means 14. Further, the distance that each stop or position is located from the start end of the travel of the carriage 12 is entered into the computer 30 through the input entry panel 40. Other input to the computer 30 entered through the input entry panel 40 includes the depth of the bores or holes that are to be drilled in the workpiece.

Means are associated with the controller 30 for operating the drilling tool 24 on the carriage 12 so that the drill bit 26 of the drilling tool 24 is advanced and retracted to form a dowel hole in the side edge of the workpiece at each position that the programable controller 30 has been programmed to form such a dowel hole. As illustrated in FIG. 1, a control conduit interconnects the controller 30 and the drilling tool 24 on the carriage 12. The computer 30 sends a signal over the control conduit to advance and retract the drill bit 26 when in the course of the operation of the apparatus the drill bit 26 is to be advanced and retracted. When the drilling tool 24 is provided with an electomechanical means for advancing and retracting the drill bit 26, the signals sent by the computer 30 over the control conduit to the drilling tool 24 are electrical currents. When the drilling tool 24 is provided with a pneumatic means for advancing and retracting the drill bit 26, the control signals sent by the computer 30 include air or pneumatic fluid for operating the pneumatic means on the drilling tool 24. In addition, the control signal would likely include electrical currents to control a solenoid valve of the pneumatic means on the drilling tool 24.

The programable controller 30 is capable of positioning the dowel inserting tool 34 in alignment with each dowel hole formed in the workpiece and of operating the dowel inserting tool 34 to insert a dowel in each respective dowel hole. The dowel inserting tool is equipped with a glue injecting nozzle 50 that injects glue into each dowel hole immediately preceding insertion of a dowel in the dowel hole. The glue injecting nozzle 50 is connected by appropriate conduit to a glue storage container 52. The glue storage container 52 is preferably pressurized with air pressure, and the computer 30 controls a valve (not shown in the drawings) for allowing glue to be ejected from the nozzle 50. The injecting nozzle 50 and means for ejecting glue from the nozzle 50 are well known in the art and need no further description.

Figure 2:
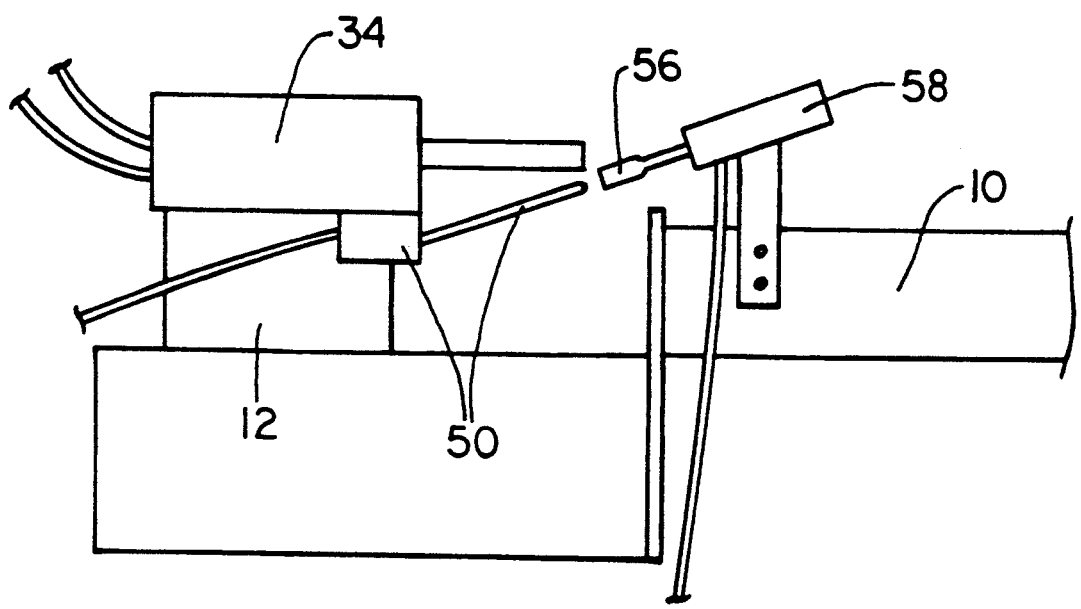

The present invention provides a novel, removable cover 56 for the glue injecting nozzle 50. As shown in FIG. 2, the cover 56 is located on the end of a plunger operated by a solenoid 58. As illustrated, the solenoid 58 can be attached to the end of the table 10 such that the cover 56 is in alignment with the nozzle 50 when the carriage 12 is in its home, inactive position at the end of the table 10. As the solenoid 58 is energized, the cover 56 is withdrawn from the end of the nozzle 50, and the carriage 12 is ready to be moved by the computer 30 along the track means 14. When the carriage 12 is returned to its home, inactive position and the apparatus is not to be used for a period of time, the solenoid 58 is de-energized and the cover 56 returns to its position covering the nozzle 50. The cover 56 prevents glue from dripping from the nozzle 50 when the apparatus is not being used. Further, the cover 56 prevents unwanted solidification of glue in the nozzle 50 during periods when the apparatus is not being used.

In operation, the automatic drilling and doweling apparatus of the present invention is controlled by the programable controller 30 which can be programmed as desired. The controller 30 moves the carriage 12 to a first position in which a dowel hole is to be formed. The controller 30 then activates the drill bit 26 of the drilling tool 24 to advance and retract thereby forming a dowel hole at that position. Following driling of the hole, the controller 30 moves the carriage 12 so that the dowel inserting tool 34 is in alignment with the dowel hole just formed. The controller 30 then activates the nozzle 50 of the dowel inserting tool 34 to inject glue into the dowel hole. Following injection of the glue, the controller 30 activates the dowel inserting tool 34 to insert a dowel in the dowel hole. Then the controller 30 moves the carriage 12 to the second and subsequent positions in which a dowel hole is to be formed, with the drill bit 26 being operated to form a dowel hole at the second and each such subsequent position. Following the drilling of each dowel hole, the carriage 12 is moved to align the dowel inserting tool 34 with each such dowel hole that is formed. Glue is injected into each such dowel hole, and a dowel is inserted in each such dowel hole.

Although preferred embodiments of the present invention have been illustrated and described, it is to be understood that the present disclosure is made by way of example and that various other embodiments are possible without departing from the subject matter coming within the scope of the following claims, which subject matter is regarded as the invention.

I claim:

1. In automatic drilling and doweling apparatus having means for securing a flat workpiece in a work position on a planar table top, drilling dowel holes in the side edge of the workpiece and inserting dowels into respective dowel holes, the improvement comprising
   means for clamping the flat workpiece to the planar table top, with the side edge of the workpiece positioned along a side of said table top;
   a moveable carriage that moves in track means along said side of said table top adjacent to and parallel with the side edge of the workpiece in which the dowel holes are to be drilled;
   a drilling tool attached to said carriage, with said drilling tool having a drill bit which can be advanced in a direction of the workpiece and retracted in a direction away from the workpiece;
   a dowel inserting tool attached to said carriage adjacent to said drilling tool, said dowel inserting tool being capable of setting a dowel in a respective dowel hole when the dowel inserting tool is aligned with such dowel hole;
   a programmable controller for controlling the movement of said carriage such that the carriage can be moved in sequence to a plurality of positions as programmed into the programmable controller;
   means associated with said controller for operating the drilling tool on said carriage so that the drill bit of said drilling tool is advanced and retracted to form a dowel hole in the side edge of the workpiece at each position that the programable controller has been programmed to form such a dowel hole; and
   said programable controller capable of positioning the dowel inserting tool in alignment with each dowel hole formed in said workpiece and of operating the dowel inserting tool to insert a dowel in each respective dowel hole.

2. An improvement in an automatic drilling and doweling apparatus in accordance with claim 1 wherein said dowel inserting tool is equipped with a glue injecting nozzle that injects glue into each dowel hole immediately preceding insertion of a dowel in the dowel hole.

3. An improvement in automatic drilling and doweling apparatus in accordance with claim 2 wherein said programable controller moves the carriage to the first position in which a dowel hole is to be formed, operates the drill bit of said drilling tool to advance and retract the drill bit to form a dowel hole at that position, moves the carriage so that the dowel inserting tool is in alignment with the dowel hole just formed, operates the dowel inserting tool to inject glue into the dowel hole and then inserts a dowel in the dowel hole subsequent to the injection of glue thereinto, then said programable controller moves the carriage to the second and subsequent positions in which a dowel hole is to be formed, with the drill bit being operated to form a dowel hole at each such subsequent position and then with the carriage being moved to align said dowel inserting tool with each such dowel hole that is formed wherein glue is injected into each such dowel hole and a dowel is inserted in each such dowel hole.

4. An improvement in automatic drilling and doweling apparatus having means for securing a workpiece in a work position, drilling dowel holes in the side edge of the workpiece and inserting dowels into respective dowel holes, said improvement comprising a moveable carriage that can move longitudinally along a path adjacent to and parallel with the side edge of the workpiece in which the dowel holes are to be drilled;

a drilling tool attached to said carriage, with said drilling tool having a drill bit which can be advanced in a direction of the workpiece and retracted in a direction away from the workpiece;

a dowel inserting tool attached to said carriage adjacent to said drilling tool, said dowel inserting tool being capable of setting a dowel in a respective dowel hole when the dowel inserting tool is aligned with such dowel hole;

a programable controller for controlling the movement of said carriage such that the carriage can be moved in sequence to a plurality of positions as programmed into the programable controller;

means associated with said controller for operating the drilling tool on said carriage so that the drill bit of said drilling tool is advanced and retracted to form a dowel hole in the side edge of the workpiece at each position that the programable controller has been programmed to form such a dowel hole;

said programable controller capable of positioning the dowel inserting tool in alignment with each dowel hole formed in said workpiece and of operating the dowel inserting tool to insert a dowel in each respective dowel hole;

a glue injecting nozzle that injects glue into each dowel hole immediately preceding insertion of a dowel in the dowel hole; and a removable cover for said glue injecting nozzle, with means for removing said cover when glue is to be injected into a dowel hold and replacing said cover during all other operations of said apparatus, whereby glue drippage from said nozzle is prevented and solidification of glue in said nozzle is also prevented.

* * * * *